United States Patent Office 3,424,474
Patented Jan. 28, 1969

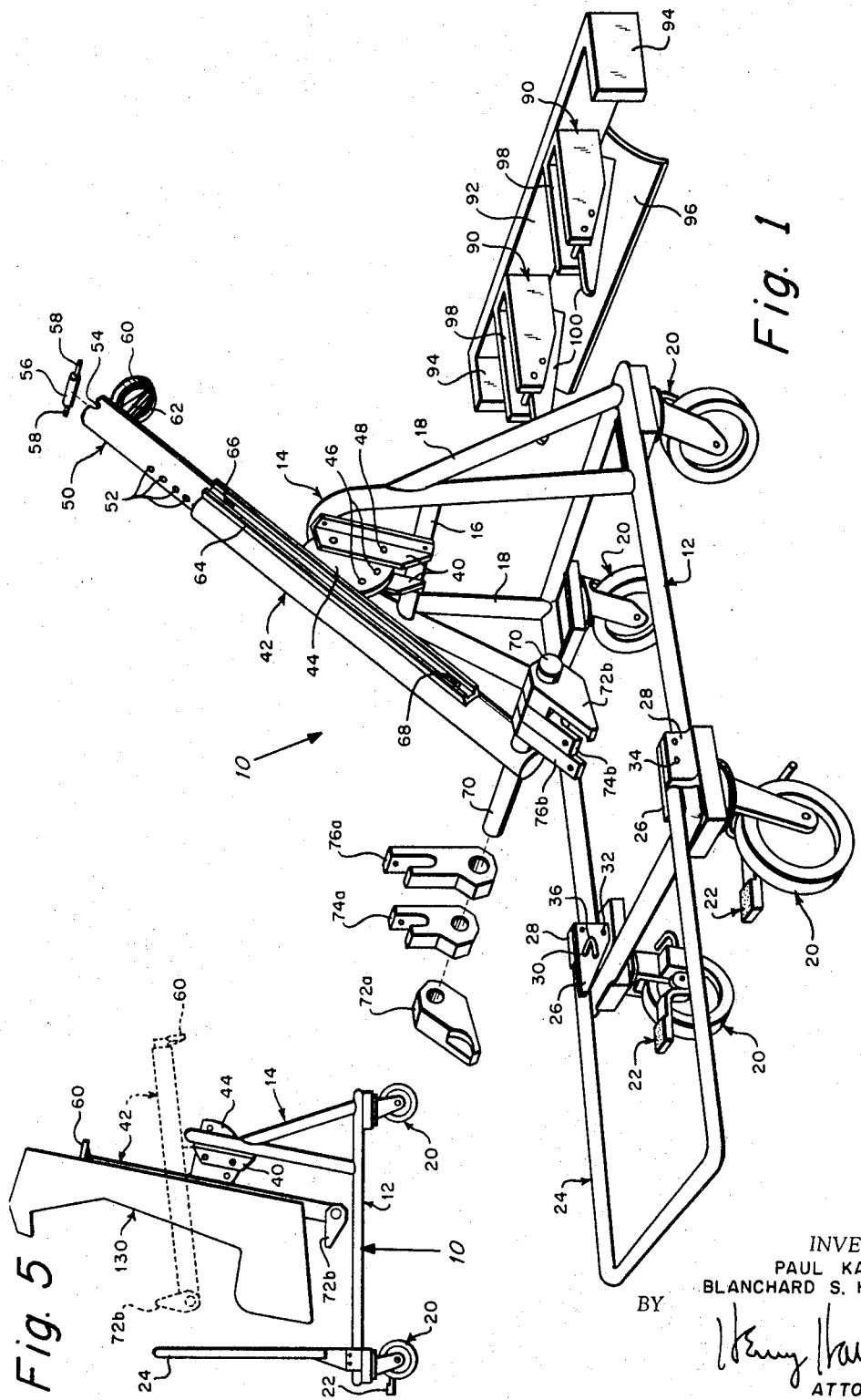

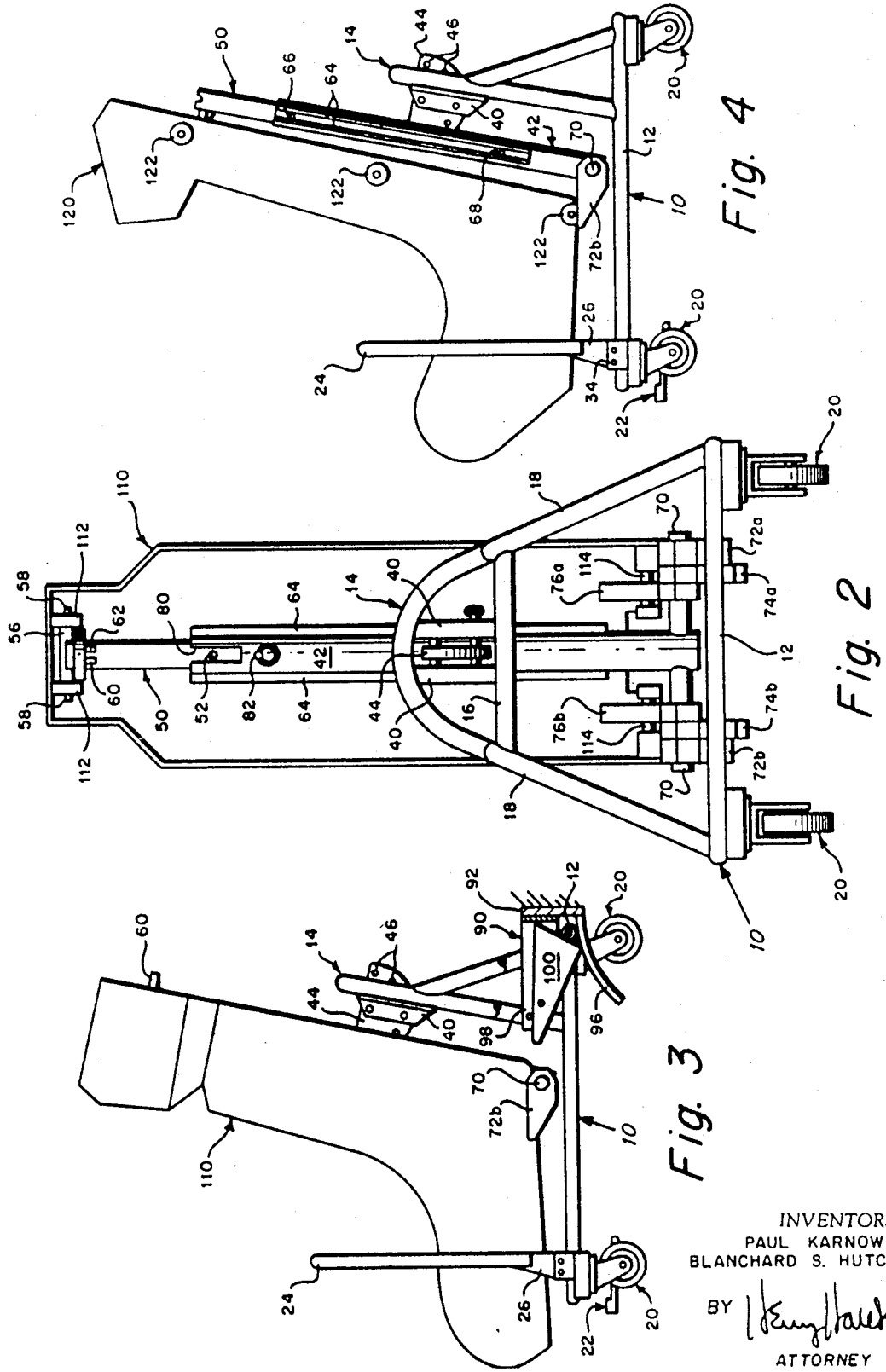

3,424,474
AIRCRAFT EJECTION SEAT DOLLY
Paul Karnow, Glenside, and Blanchard S. Hutchins, Warrington, Pa., assignors to the United States of America as represented by the Secretary of the Navy
Filed Jan. 6, 1967, Ser. No. 607,862
U.S. Cl. 280—79.2                                    13 Claims
Int. Cl. B62b 5/00; A47f 7/00; A47g 29/00

ABSTRACT OF THE DISCLOSURE

A dolly having a plurality of selectively positionable fittings each adapted for securement to a respective configuration of aircraft ejection seat for supporting and transporting any one of a number of different configurations of aircraft ejection seats. The dolly is usable in combination with a bulkhead mounted keeper for stowing an aircraft ejection seat.

---

The invention described herein may be manufactured and used by or for the Government of the United States of America for governmental purposes without the payment of any royalties thereon or therefor.

Background of invention

It is frequently necessary during maintenance and repair of both land and carrier based aircraft to remove their respective aircraft ejection seats in order both to provide access to other portions of the aircraft and to permit inspection, maintenance and repair of the ejection seat itself. Since a pilot's safety may very well depend upon the reliability of the aircraft ejection seat, it is critical that great care be taken in the handling and stowage of the ejection seat when it has been removed from the aircraft. Since seat stowage space may be at a premium, particularly on an aircraft carrier, a need has arisen for an aircraft ejection seat dolly which can securely support any of the number of different configurations of aircraft ejection seats which are used in respective different types of aircraft commonly based as aboard an aircraft carrier.

Summary of invention

It is the general purpose of this invention to provide a rugged dolly for supporting, transporting, and stowing aircraft ejection seats, which dolly is adaptable to receive any one of a number of different configurations of such seats. Briefly, this is accomplished by providing a tubular chair support member pivotally connected to a wheeled frame which has fixed thereto in selectively adjustable positions adapter lugs for securing an ejection seat thereto and has a telescoping tubular member including selectively positionable fittings for engaging the seat in combination with the lugs. Another objective of the invention is to provide a dolly which is adapted to support the seat in complete safety at all times when the seat has been removed from the aircraft. This in part is accomplished by providing the dolly with selectively actuatable wheel brakes and by providing a wall-mounted keeper bracket adapted to secure the dolly. Other objects and advantages of the invention will hereinafter become more fully apparent from the description of the annexed drawing which illustrates a preferred embodiment.

Brief description of drawing

FIG. 1 represents an isometric view of a dolly and keeper bracket therefor according to the invention having portions of the dolly displaced therefrom;

FIG. 2 represents a rear view in elevation of the dolly of FIG. 1 having secured thereto an aircraft ejection seat of a first configuration;

FIG. 3 represents a reduced side view in elevation of the dolly of FIG. 2 secured by the keeper bracket of FIG. 1 with portions broken away;

FIG. 4 represents a side view in elevation of the dolly of FIG. 1 having secured thereto a seat of a second configuration, and FIG. 5 represents a side view in elevation of the dolly of FIG. 1 having secured thereto a seat of a third configuration.

Description of preferred embodiment

Referring to FIG. 1, the aircraft ejection seat dolly generally designated at 10 includes welded together a rectangular frame 12 of tubular steel and an inclined, inverted U-shaped truss 14 also of tubular steel having a transverse cross member 16 arranged near the apex and support members 18 extending between the apex of the truss 14 and the corners of the frame 12 at one end thereof. Each of the four corners of the frame 12 is supported above the floor by a swively mounted caster 20 which includes a locking device, not shown, for selectively locking the caster in a straight ahead position and further includes selectively actuatable wheel brakes schematically shown at 22.

A U-shaped towing handle 24 has its ends fixed to respective plates 26 which, in turn, are pivotally connected to respective brackets 28 welded to the frame 12. The plates 26 each include apertures 30 and 32 which are positioned respectively to register with an aperture 34 formed in each bracket 28 when the handle 24 is arranged either in an extended position or in an upright position so that the handle 24 may be locked in a selected position as by a locking pin 36.

A pair of flanged plates 40 are fixed to extend between the cross member 16 and the apex of the truss 14 in spaced-apart parallel positions. A tubular barrel 42 has fixed thereto a radially extending plate 44 which, in turn, is positioned between the flanged plates 40 and is pivotally connected thereto adjacent the apex of the truss 14. The plate 44 further includes a plurality of apertures 46 which are each selectively registerable with a coaxial pair of apertures 48 formed in the plates 40 and enable as by a pin the locking of the barrel 42 in a range of positions from horizontal to almost vertical.

A telescoping tube 50 is slidingly received within the barrel 42 and extends from the end thereof adjacent the apex of the truss 14. This telescoping tube 50 has formed therein intermediate its ends longitudinally spaced pairs of diametrically opposed, coaxial apertures 52 and has formed in the extensible end thereof a pair of diametrically opposed slots 54 which are of a size to receive an adapter pin 56 having coaxial projections 58 extending from each end thereof which are formed for connection with corresponding fittings conventionally carried by some configurations of ejection seats. The pin 56 may be connected to the tube 50 by a length of wire and stored within the extensible end thereof when not in use. The extensible end of the tube 50 further includes a circular collar seat 60 formed for engaging corresponding fittings conventionally carried by other configurations of ejection seats and fixed to the extensible end of the tube 50 by a pair of spaced apart plates 62.

The barrel 42 has fixed thereto a diametrically opposed pair of outwardly facing U-shaped channels 64, only one of which is shown in FIG. 1, which longitudinally extend from the tube receiving end of the barrel 42 toward the other end thereof. The channels 64 include coaxial apertures 66 registering with corresponding apertures in the barrel 42 positioned at the tube receiving end of the barrel 42 and have adjacent their other ends a centrally disposed respective stop pin 68 projecting therefrom.

The barrel 42 further has fixed thereto at its other end the center portion of a horizontally disposed, tubular cross member 70 whose free ends provide support for symmetrically arranged pairs of adapter lugs 72a, 72b, 74a, 74b, 76a, and 76b which pairs are each formed for connection with corresponding fittings conventionally carried by respective configurations of ejection seats. The lugs are each selectively pivotable between a use position, demonstrated by the lugs 72a, 74a, and 76a, which have been exploded away, and a non-use position demonstrated by the lugs 72b, 74b and 76b. Quick release lock pins, not shown, conveniently attached to the member 70 by lengths of wire may be used to lock the lugs in selected positions and to effect a locked engagement thereby of the respective appropriate ejection seat fittings, not shown.

Referring now to FIG. 2, it is seen that the tube receiving end of the barrel 42 has formed therein a slot 80 of a size to permit passage therealong of the plates 62 of the tube 50 whereby the extensible end of the tube 50 may be withdrawn to a point inwardly of the registering apertures 66 extending through the channel members 74 and the barrel 42. The barrel 42 further includes an aperture positioned adjacent the interior end of the slot 80 for receiving a locking pin 82 which is inserted therethrough and through a selected registering aperture 52 in the telescoping tube 50.

The keeper bracket generally designated 90 in FIG. 1 is adapted to be connected to the bulkhead of a ship as by welding and includes a wall-mounted plate 92 having its ends fixed to the ends of projecting guide plates 94 which, in turn, are spaced apart for receiving therebetween the rear end of the frame 12 of the dolly 10. A shelf plate 96 is fixed to and projects from the lower edge of the plate 92 at a level below the rear end of the frame 12. Spaced apart brackets 98 are fixed to and project from the plate 92 above the level of the frame 12. Each bracket 98 provides support for a respective triangular keeper 100 which is pivotally mounted apart from its center of gravity so that it is normally urged to engage the shelf plate 92 and form along with the shelf plate 96 the bracket 98 and the wall plate 92 a releasable encirclement for receiving and securing therebetween the rear end of the frame 12 of the dolly 10. To stow the dolly 10 together with a seat supported thereby, the frame 12 is pushed against the keepers 100 causing them to ride upwardly until the frame 12 abuts the wall plate 92 whereupon the keepers 100 lock as shown in FIG. 3 to secure the frame 12 against the wall. In removing the dolly 10 from securement to the wall, the projecting ends of the keepers 100 are pushed downward to allow withdrawal of the frame 12.

The seat 110 of the exemplary configuration shown in FIGS. 2 and 3 normally includes fixed thereto a pair of trunnion fittings 112, shown in FIG. 2, which project rearwardly from the upper portion of the seat, and a pair of roller bearing sleeves 114, which are positioned on the back side of the seat adjacent the intersection of the back and the seat portion thereof. In loading the seat 110, the lugs 76a and 76b are pivoted to the use position, the lugs 72a and 72b, 74a and 74b being positioned in non-use position. The inclination of the barrel 42 is adjusted to an almost vertical inclination as shown in FIG. 3, and the seat 110 is positioned so that the lugs 76a and 76b receive the bearing sleeves 114. The pin 56 is received within the slots 54 of tube 50, and the tube 50 is extended so that a selected one of the pairs of the apertures 52 is in registry with that of the barrel 46 permitting insertion of the locking pin 82. The seat 110 is then rotated against the barrel 42 so that its trunnion fittings 112 receive and engage the projections 58 of the pin 56. The bearings 114 are locked within the adapter lugs 76a and 76b as by locking pins, not shown, and the seat 110 is firmly secured to the dolly 10.

The configuration of seat 120 shown in FIG. 4 commonly has mounted along the sides of the back portion thereof a plurality of seat rollers 122 and has a collar fitting, not shown, fixed to the upper portion of the back thereof. The seat 120 is loaded on the dolly in the same manner as was the seat 110. The adapter lugs 72a and 72b, which are provided with surfaces shaped to receive the lowermost seat rollers 122, are pivoted to the use position and the seat 120 is placed thereon and rotated against the barrel 42. The tube 50 is rotated so that the collar seat 60 extends forward of the dolly 10 and is extended to a second selected position wherein the collar seat 60 engages the collar fitting of the seat 120, thereby registering the other of the apertures 52 for locking by pin 82.

Referring to FIG. 5 a third configuration of seat 130 is shown which includes upper and lower pairs of rocket gun slippers, not shown. In loading this seat 130, the telescoping tube 50 is completely withdrawn so that the plates 62 thereof contact the interior end of the slot 80 of the barrel 42 which, in turn, is horizontally positioned as shown in FIG. 5 in dotted lines. The seat 130 is positioned so that the lower pair of rocket gun slippers thereof are guided onto the channels 64; the slippers are slid along the channels 64 to the stop member 68; and the upper rocket gun slippers are guided onto the channels 64. The apertures 66 are positioned so that a pin, not shown, may be inserted therethrough to lock the seat 130 to the dolly and restrict its motion relative to the channels 64.

Thereby, ejection seats may be hoisted from their aircraft and loaded into respective dollies and transported to a maintenance area. The casters 20 may be locked and braked, and the seat may be easily inclined to any selected position, thereby providing easy access for inspection and repair of the seat. The handle 24 may be locked in an extended position to form a bumper to protect the seat from injury. At other times, the dolly 10 may be secured against the bulkhead as above described in close adjacency with other such dollies. The handle 24 may be used as a bumper or as a guard when locked in an upright position. From the above it is apparent that there has been provided a rugged dolly for reliably supporting any one of a number of different configurations of ejection seats and minimizing actual seat handling to times of removal or replacement of the seat from or into its aircraft. Of course, the dolly 10 may be equipped with adapter fittings which are different from those shown and which are also adapted to be connected with the fittings on other configurations of aircraft ejection seats not shown.

It should be understood, of course, that the foregoing disclosure relates only to a preferred embodiment of the invention and that numerous modifications or alterations may be made without departing from the spirit and scope of the invention as set forth in the appended claims.

What is claimed is:

1. Apparatus for supporting an aircraft ejection seat having any one of a plurality of different configurations comprising:

a base;

an elongated seat support member connected to said base;

a cross member fixed intermediate its ends to and extending transversely of said support member at one end thereof;

first and second adapter fittings mounted on respective ends of said cross member and being formed to securingly engage a seat of a first configuration;

a pair of outwardly facing channel members each having a stop pin fixed to project therefrom and each being fixed to and extending longitudinally along opposite sides of said support member, said channel members being formed and arranged to receive and support a seat of a second configuration in spaced relation to said cross member and said first and second fittings; and a third adapter fitting connected to the other end of said support member for movement between a use position and a non-use position and formed to engage a seat of the first configuration when in said use position and to cooperate with said first and second adapter fittings to support a seat of the first configuration in spaced relation to said channel members.

2. Apparatus according to claim 1 wherein said support member includes:
a barrel having said cross member fixed thereto at one end; and
a telescoping tube slidingly received within said barrel from the other end thereof and having said third adapter fitting connected to the extensible end thereof, said tube being selectively movable to a withdrawn position within said barrel to position said third fitting in said non-use position and to an extended position to position said third fitting in said use position.

3. Apparatus according to claim 2 wherein:
said channel members are coextensive with said other end of said barrel;
said third adapter fitting includes a platform member fixed to and projecting transversely from said extensible end of said tube; and
said barrel has formed therein a longitudinal slot extending between said channel members from said other end of said barrel, said slot being of a size to receive and permit movement of said platform member therealong for selective withdrawal of said tube to position said extensible end within said barrel and to position said platform inwardly of said other end of said barrel.

4. Apparatus according to claim 3 wherein:
said extensible end of said tube includes formed therein diametrically opposed slots;
said apparatus further includes forth and fifth adapter fittings carried on respective ends of said cross member and being movable between a use position and a non-use position, said fourth and fifth adapter fittings being formed to securingly engage and support a seat of a third configuration when arranged in said use position; and
a sixth adapter fitting receivable in a use position within said slots of said tube, formed to engage a seat of the third configuration and to cooperate with said fourth and fifth adapter fittings to secure a seat of the third configuration to said apparatus in spaced relation to said channel members.

5. Apparatus according to claim 2 wherein said base includes:
a frame of polygonal configuration whose periphery circumscribes a frame area wider than the ejection seats to be supported;
a plurality of wheels connected to and supporting said frame;
a truss fixed to said frame adjacent an end thereof for providing a seat support connection point inwardly of said end of said frame in registry with and spaced from said frame area;
said barrel being pivotally connected intermediate its ends to said truss at said connection point for movement between parallel and upright positions relative to said frame; and
locking means connected between said truss and said barrel for locking said barrel in a selected orientation relative to said frame.

6. Apparatus according to claim 5 wherein:
said frame is rectangular; and
said apparatus includes a bifurcated handle having the same width as said frame and pivotally connected at its ends to one end of same frame for movement relative to said frame between extended and upright positions.

7. Apparatus according to claim 6 wherein:
said handle includes operatively connected thereto a selectively actuatable lock for locking said handle in an upright position;
said wheels are swivelly connected to said frame; and
said apparatus further includes a selectively actuatable brake operatively connected to said frame.

8. Apparatus for supporting an aircraft ejection seat having any one of a plurality of different configurations comprising:
a frame;
a plurality of wheels connected to and supporting said frame;
a barrel pivotally connected to said frame for movement between parallel and upright positions relative to said frame;
a telescoping tube slidingly received within said barrel from one end thereof;
releasable locking means connected to said barrel for locking said tube in a selected, extended position;
a cross member fixed intermediate its ends to and extending transversely of the other end of said barrel;
first and second pairs of adapter fittings, said fittings of each said pair being pivotally connected to said cross member on respective sides of said barrel, each said pair beting formed to engage when in a use position, seat-carried fittings of a corresponding configuration arranged adjacent the bottom edge of the back portion of an ejection seat of a respective configuration, each of said fittings being selectively pivotable between a non-use position and said use position; and
third and fourth adapter fittings connected to the extensibe end of said tube, each said third and fourth fitting being formed to engage when in a use position a seat-carried fitting arranged on the upper back portion of a seat of a respective configuration and to cooperate with a respective one of said first and second pairs of adapter fittings for securing a seat of the respective configuration to said apparatus.

9. Apparatus according to claim 8 wherein:
said channel members are coextensive with said one end of said barrel;
said third adapter fitting includes a platform member fixed to and projecting transversely from said extensible end of said tube; and
said barrel has formed therein a longitudinal slot extending between said channel members from said one end of said barrel, said slot being of a size to receive and permit movement of said platform member therealong for selective withdrawal of said tube to position said extensible end within said barrel and to position said platform inwardly of said one end of said barrel.

10. Apparatus according to claim 9 further comprising:
a bifurcated handle pivotally connected at its ends to one end of said frame;
a truss fixed to the opposite end of said frame;
a pair of parallel plates fixed to said truss in spaced upright relation relative to said frame and having formed therein aligned locking apertures spaced a predetermined distance from a pivotal connection point;
a triangular plate rigidly fixed to and projecting from said barrel intermediate said ends and received between and pivotally connected to said truss plates at said pivotal connection point and including a curved array of a plurality of locking apertures spaced said predetermined distance from said pivotal connection; and
a locking pin removably inserted through said locking apertures of said truss plates and through a selected one of said locking apertures of said triangular plate.

11. Apparatus according to claim 10 wherein:
said handle includes operatively connected thereto a selectively actuatable lock for locking said handle in an upright position;
said wheels are swivelly connected to said frame; and
said apparatus further includes a selectively actuatable brake operatively connected to said frame.

12. Apparatus according to claim 11 further comprising:

a device formed to be fixed to a wall and to releasably secure said one end of said frame thereto.

13. Apparatus according to claim 12 wherein said device includes:
   a first plate formed to be fixed to a wall;
   a second plate fixed to and projecting from an edge of said first plate;
   a pair of guide plates fixed to and projecting from respective ends of said first plate and spaced apart for receiving therebetween a portion of said frame;
   a portion of said frame being positioned adjacent the interface of said first and second plates and being positioned between said guide plates;
   a spaced apart pair of brackets fixed to and projecting from said first plate, said frame portion being positioned between said brackets and said second plate; and
   a pair of keepers each pivotally connected to a respective said bracket and having an edge forming with said first and second plates a releasable, securing encirclement of said frame portion for preventing withdrawal of said frame portion from adjacency with said first and second plates.

References Cited

UNITED STATES PATENTS

| | | | |
|---|---|---|---|
| 794,273 | 7/1905 | Beall | 211—27 |
| 2,815,566 | 12/1957 | Hille | 214—1 |
| 2,897,928 | 8/1959 | Selig | 248—224 X |
| 2,930,561 | 3/1960 | Bittle | 248—125 X |
| 2,965,874 | 12/1960 | Modrey | 248—224 X |
| 2,967,627 | 1/1961 | Vinson | 214—1 |
| 3,040,908 | 6/1962 | Johnson | 214—1 |
| 3,208,614 | 9/1965 | Armitage et al. | 280—47.24 |
| 3,279,617 | 10/1966 | Small | 211—27 |

BENJAMIN HERSH, *Primary Examiner.*

JOEL E. SIEGEL, *Assistant Examiner.*

U.S. Cl. X.R.

211—27; 248—124